United States Patent [19]
Teller et al.

[11] Patent Number: 5,387,766
[45] Date of Patent: Feb. 7, 1995

[54] SCALE WITH ABUSE DETECTION AND RECORDAL SYSTEM

[75] Inventors: David M. Teller; Lance Ong, both of New York, N.Y.

[73] Assignee: Jopo, Inc., New York, N.Y.

[21] Appl. No.: 82,027

[22] Filed: Jun. 24, 1993

[51] Int. Cl.6 .............................................. G01G 21/22
[52] U.S. Cl. ............................................ 177/262; 177/128
[58] Field of Search .......................... 177/262, 128, 189

[56] References Cited

U.S. PATENT DOCUMENTS

| | | | |
|---|---|---|---|
| 2,936,163 | 5/1960 | Foster | 177/25.19 |
| 3,863,724 | 2/1975 | Dalie, Jr. | 177/25.19 |
| 4,064,954 | 12/1977 | Rock | 177/25.15 |
| 4,136,750 | 1/1979 | Strickler | 177/189 |
| 4,237,988 | 12/1980 | Blawert et al. | 177/189 |
| 4,526,247 | 7/1985 | EerNisse et al. | 177/189 X |
| 4,836,293 | 6/1989 | Gebo et al. | 177/212 X |
| 5,195,599 | 3/1993 | Salini | 177/189 |

FOREIGN PATENT DOCUMENTS 0603210  6/1948  United Kingdom ............... 177/262

*Primary Examiner*—George H. Miller, Jr.
*Attorney, Agent, or Firm*—Amster, Rothstein & Ebenstein

[57] ABSTRACT

A scale incorporating an abuse detection and recordal system has a scale for weighing an article placed thereon, the scale defining a surface adapted to support the article thereon and a component damageable by an excessive force downwardly directed on the support surface. A frangible layer is disposed on the support surface and frangible by a downwardly directed force less than the excessive force required to damage the component, whereby the frangible layer acts as an abuse detection and recordal system to detect and record the use of such force.

9 Claims, 1 Drawing Sheet

SCALE WITH ABUSE DETECTION AND RECORDAL SYSTEM

BACKGROUND OF THE INVENTION

The present invention relates to a scale for weighing an article placed thereon, and more particularly to such a scale which incorporates an abuse detection and recordal system.

With the exception of balance beams, which tend to be bulky, expensive and slow in operation, scales typically rely upon a transducer (such as a spring) to convert the force of the weight of an article placed its support surface into a meaningful measure of weight (such as the deflection of a pointer, the generation of an electrical signal, or the like). This transducer component is typically easily damageable by an excessive force directed downwardly on the surface adapted to support the article thereon.

Teller et al. U.S. Pat. No. 4,961,533, issued Oct. 9, 1990, discloses an inventory control system which is particularly described in connection with an inventory control system for alcoholic beverages dispensed from bottles intended for use in bars, restaurants, entertainment clubs and the like. The purpose of the scale in the system is at least in part to detect theft, cheating and the like by bartenders or other bar personnel, while broadly applicable to a variety of different applications. As a result, a bartender may either maliciously or accidentally place a bottle on the scale with such force that the scale becomes damaged. Of course, the bartender later blames the manufacturer of the inventory control system and denies that any abuse of the system occurred. The manufacturer of the inventory control system and the bar owner have to accept the statement of the bartender since it is known that transducer components occasionally fail even in the absence of abuse thereof.

Accordingly, it is an object of the present invention to provide a scale which detects and records the use of any abusive force thereon.

Another object is to provide a scale which in a preferred embodiment tends to reduce breakage thereof.

A further object is to provide such a scale which both provides proof of any use of abusive force thereon and reduces breakage thereof.

It is another object of the present invention to provide such a scale which is economical to manufacture and easy to maintain and use.

SUMMARY OF THE INVENTION

It has now been found that the above and related objects of the present invention are obtained in a scale incorporating an abuse detection and recordal system. The scale comprises means for weighing an article placed thereon, the weighing means defining a surface adapted to support the article thereon and a component damageable by an excessive force downwardly directed on the support surface. Frangible means are disposed on the support surface and frangible by a downwardly directed force less than the excessive force required to damage the component, whereby the frangible means acts as an abuse detection and recordal system to detect and record the use of such force.

In a preferred embodiment, the frangible means is frangible only by a downwardly directed force substantially greater than the force with which the article is ordinarily placed thereon, preferably a downwardly directed force which is at least 90% of the excessive force required to damage the component. The frangible means is a removable and replaceable element of the weighing means.

The frangible means preferably has the appearance of glass and may be a pane of glass. An easily deformable pad means is disposed intermediate the support surface and the frangible means to facilitate breaking of the frangible means when the support surface is rigid.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
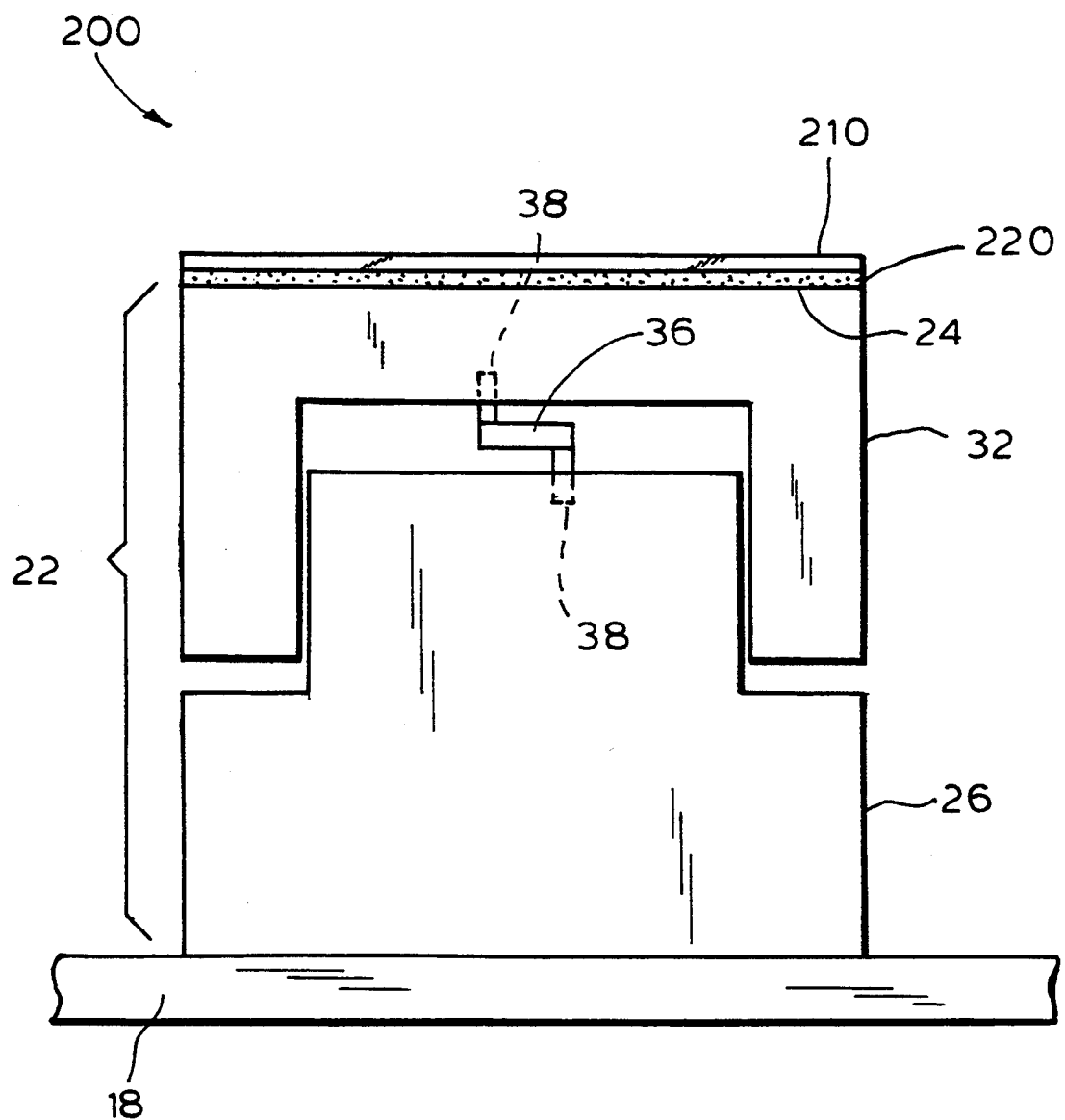
FIG. 1 is a front elevational view, in cross section, of a scale according to the present invention.

It will be appreciated that the principles of the present invention are applicable to a wide variety of scales, both in order to minimize breakage thereof and in order to provide a system for detecting and recording the abuse thereof. The system will be described herein particularly in connection with scales of the type shown and described in Teller et al. U.S. Pat. No. 4,961,533. Accordingly, FIG. 1 hereof uses the same reference numerals (under 100) to represent like elements of FIG. 2 of the aforementioned patent, the substance of that patent hereby being incorporated by reference as fully as if it were set forth herein.

Referring now to the drawing, and in particular to FIG. 1 thereof, therein illustrated is a scale according to the present invention, generally designated by the reference numeral 200. The scale 200 includes in its conventional aspects an assembly 22 similar to that described in the aforementioned patent and comprising a fixed bottom 26, a movable mounting member 32, and a load cell 36 which is connected by rigid connectors 38 both to the movable mounting member 32 and the fixed bottom 26 so as to variably space the former above the latter. The load cell 36 is the damageable transducer component of the present invention and may include a stress/strain gauge or the like. The assembly 22 is typically disposed on a fixed substrate 18, such as a shelf or floor. When a bottle or other article (not shown) is placed on the upper surface 24 of the movable mounting means 32, the weight of the bottle tends to cause the movable mounting means 32 to move downwardly, closer to the fixed bottom 26, thereby inducing a stress/strain in load cell 36 which is either immediately indicated as a weight indication or by production of an electrical signal or the like ultimately indicating the weight of the bottle placed thereon. As earlier noted, if the bottle is placed on the upper surface 24 of the movable mounting member 32 with too much force, the load cell 36 may become damaged. For example, the stress/strain sensing element thereof may be subjected to a stress/strain beyond its working range.

According to the novel aspects of the present invention, a frangible means 210 is disposed on or above the upper surface 24 of the movable mounting means 32. The frangible member 210 is frangible by an abusive downwardly directed force less than the excessive force required to damage the load cell 36. Preferably the frangible member 210 is frangible only by an abusive downwardly directly force substantially greater than the force with which the article or bottle is ordinarily placed thereon, and at least 90% of the excessive force required to damage the load cell 36. In any case, the frangible member 210 must break if it is subjected to an abusive downward directed force which is excessive—that is, which is sufficient to damage the load cell 36. Thus, the frangible member 210 not only detects abuse of the scale (by breaking), but visually records the abuse for others to see (by remaining broken). Thus, when the bartender is subsequently accused of having abused the scale, there is proof that he used abusive force (which may be correlated with a certain percentage of the excessive force required to damage the scale), regardless of whether the breakage of the scale (i.e., the transducer 36) resulted from that force or other factors.

In a preferred embodiment, the frangible member 210 has the appearance of a pane of glass. The appearance of a pane of glass on the support surface 24 of the movable mounting means 32 will deter a bartender from inadvertently placing bottles on the scale with such force as to break the glass since people typically take care when placing articles on a glass surface. Thus the presence of the appearance of glass acts as a psychological deterrent. In fact, the frangible member 210 may be formed of glass or other frangible material having the appearance of glass.

In the preferred embodiment of the present invention where the frangible means 210 has the appearance of glass, the scale of the present invention operates in two distinctly different ways: the psychological aspect of the presence of glass tends to preclude inadvertent damaging of the scale, and the functional aspect of the presence of the frangible element 210 providing an evidentiary aspect of the invention when excessive force is nonetheless employed thereon.

The frangible member 210 is a removable and replaceable element of the scale 200. Preferably it is not easily removable and replaceable, or a bartender could simply remove the frangible member 210, damage the scale 200, replace the unbroken frangible member 210, and then utilize the presence of an unbroken frangible member 210 as proof that he did not employ excessive force. Similarly, the frangible member 210 preferably bears indicia to prevent its counterfeiting so that the bartender cannot himself replace a broken frangible member 210 with an unbroken frangible member 210. To like ends, the frangible member 210 may be secured to the assembly 22 by means which are replaceable only by the bar owner. For example, a wire loop (not shown) may secure the frangible member 210 to the top surface 24 with the free ends of the loop being joined together by a non-counterfeitable sealing member applied by the bar owner or the inventory control system manufacturer. Thus the frangible member 210 cannot be removed from the top surface 24 by the bartender without breaking the seal of the wire loop and thus evidencing improper tampering with the scale.

Where the upper surface 24 of the movable mounting member 32 is rigid, it may interfere with breaking of the frangible member 210. Thus, in such a case, an easily deformable member 220 is preferably disposed intermediate the upper surface 24 and the frangible member 210 to prevent the upper surface 24 from reducing the frangibility of the frangible member 210. Thus a pad of flexible foam or like easily deformable cushioning 220 may be disposed intermediate the frangible member 210 and the upper surface 24, thereby to facilitate breakage of the frangible member 210 when abusive force is applied thereto. Naturally, the effect of the easily deformable pad 220 must be taken into account in determining the frangibility of the frangible member 210 relative to the excessive force required to damage the transducer or load cell 36.

To summarize, the present invention provides a scale which detects and records the use of any abusive force thereon and, in a preferred embodiment, also tends to reduce breakage thereof. The scale is easy to maintain and use.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A scale incorporating an abuse detection and recordal system, said scale comprising:
   (A) means for weighing an article placed thereon, said weighing means defining a surface adapted to support the article thereon and a component damageable by an excessive force downwardly directed on said support surface; and
   (B) frangible means disposed on said support surface and frangible by a downwardly directed force less than the excessive force required to damage said component;
      whereby said frangible means acts as an abuse detection and recordal system to detect and record the use of such force.

2. The scale of claim 1 wherein said frangible means is frangible only by a downwardly directed force substantially greater than the force with which the article is ordinarily placed thereon.

3. The scale of claim 2 wherein said frangible means is frangible by a downwardly directed force which is at least 90% of the excessive force required to damage said component.

4. The scale of claim 1 wherein said frangible means is a removable and replaceable element of said weighing means.

5. The scale of claim 4 wherein said frangible means is glass.

6. The scale of claim 1 wherein said frangible means has the appearance of glass.

7. The scale of claim 1 additionally including an easily deformable pad means disposed intermediate said support surface and said frangible means to facilitate breaking of said frangible means when said support surface is rigid.

8. A scale incorporating an abuse detection and recordal system, said scale comprising:
   (A) means for weighing an article placed thereon, said weighing means defining a surface adapted to support the article thereon and a component damageable by an excessive force downwardly directed on said support surface; and
   (B) a removable and replaceable frangible means disposed on said support surface and formed of glass, said frangible means being frangible by a downwardly directed force which is at least 90% of the excessive force required to damage said component and substantially greater than the force with which the article is ordinarily placed thereon; whereby said frangible means acts as an abuse detection and recordal system to detect and record the use of such force.

9. The scale of claim 8 additionally including an easily deformable pad means disposed intermediate said support surface and said frangible means to facilitate breaking of said frangible means when said support surface is rigid.

* * * * *